United States Patent
Olsson et al.

(10) Patent No.: US 11,182,458 B2
(45) Date of Patent: Nov. 23, 2021

(54) THREE-DIMENSIONAL LANE PREDICATION FOR MATRIX OPERATIONS

(71) Applicant: International Business Machines Corporation, Armonk, NY (US)

(72) Inventors: Brett Olsson, Cary, NC (US); Brian W. Thompto, Austin, TX (US); Jose E. Moreira, Irvington, NY (US); Silvia Melitta Mueller, Altdorf (DE); Andreas Wagner, Weil im Schönbuch (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 131 days.

(21) Appl. No.: 16/712,103

(22) Filed: Dec. 12, 2019

(65) Prior Publication Data
US 2021/0182359 A1  Jun. 17, 2021

(51) Int. Cl.
*G06F 17/16* (2006.01)
*G06F 7/72* (2006.01)
*G06F 7/544* (2006.01)
*G06F 9/30* (2018.01)

(52) U.S. Cl.
CPC ............ *G06F 17/16* (2013.01); *G06F 7/5443* (2013.01); *G06F 7/72* (2013.01); *G06F 9/3001* (2013.01)

(58) Field of Classification Search
CPC .......... G06F 17/16; G06F 9/3001; G06F 7/72; G06F 7/5443
USPC ........................................................ 708/520
See application file for complete search history.

(56) References Cited

U.S. PATENT DOCUMENTS

| | | | |
|---|---|---|---|
| 9,697,176 B2 | 7/2017 | Daga et al. | |
| 9,960,917 B2 | 5/2018 | Gopal et al. | |
| 10,073,817 B1 | 9/2018 | Patil et al. | |
| 10,338,919 B2 | 7/2019 | Boswell et al. | |
| 10,346,507 B2 | 7/2019 | Rennich | |
| 10,372,787 B2 | 8/2019 | Park et al. | |
| 2017/0293659 A1 | 10/2017 | Huang | |
| 2018/0373678 A1 | 12/2018 | Redfern et al. | |
| 2019/0050372 A1 | 2/2019 | Zeng et al. | |
| 2019/0065149 A1 | 2/2019 | Hansen et al. | |

(Continued)

FOREIGN PATENT DOCUMENTS

| CN | 104137055 A | 11/2014 |
|---|---|---|
| EP | 2798457 B1 | 11/2014 |

OTHER PUBLICATIONS

Kiraly, et al., "Combinatorial Algebraic Approach for the Identiability of Low-Rank Matrix Completion," Proceedings of the 29 th International Confer-ence on Machine Learning, Edinburgh, Scotland, UK, 2012; 8 pages.

(Continued)

*Primary Examiner* — Tan V Mai
(74) *Attorney, Agent, or Firm* — Cantor Colburn LLP; Bryan Bortnick

(57) ABSTRACT

Embodiments of the present invention are directed to a new instruction set extension and a method for providing 3D lane predication for matrix operations. In a non-limiting embodiment of the invention, a first input matrix having m rows and k columns and a second input matrix having k rows and n columns are received by a compute array of a processor. A three-dimensional predicate mask having an M-bit row mask, an N-bit column mask, and a K-bit rank mask is generated. A result matrix of up to m rows, up to n columns, and up to k rank updates is determined based on the first input matrix, the second input matrix, and the predicate mask.

20 Claims, 6 Drawing Sheets

(56) References Cited

U.S. PATENT DOCUMENTS

| | | |
|---|---|---|
| 2019/0079768 A1 | 3/2019 | Heinecke et al. |
| 2019/0079903 A1 | 3/2019 | Dreyer et al. |
| 2019/0121837 A1 | 4/2019 | Azizi et al. |
| 2019/0303757 A1 | 10/2019 | Wang et al. |
| 2019/0324746 A1 | 10/2019 | Maiyuran et al. |
| 2021/0124794 A1* | 4/2021 | Nair ..................... G06F 7/5443 |

OTHER PUBLICATIONS

Landsberg, et al., "New Lower Bounds for the Rank of Matrix Multiplication," Siam J. Comput. 2014 Society for Industrial and Applied Mathematics; vol. 43, No. 1, pp. 144-149 (6 pages).

Pal, et al., "OuterSPACE: An Outer Product based Sparse Matrix Multiplication Accelerator," 2018 IEEE International Symposium on High Performance Computer Architecture; pp. 724-736; (13 pages).

Raynolds, et al., "A generalized inner and outer product of arbitrary multi-dimensional arrays using A Mathematics of Arrays (MoA)," College of Nanoscale Science and Engineering: National Science Foundation; Nov. 20, 2018; 7 pages.

Solomonik, et al., "Communication-optimal parallel 2.5D matrix multiplication and LU factorization algorithms," Department of Computer Science, University of California at Berkeley, Euro-Par'11 17th International Conference on, Part II, pp. 90-109, Aug. 29-Sep. 2, 2011; 15 pages.

International Search Report; International Application No. PCT/IB2020/061373; International Filing Date: Dec. 2, 2020; dated Mar. 15, 2021; 8 pages.

\* cited by examiner

THREE-DIMENSIONAL LANE PREDICATION FOR MATRIX OPERATIONS

BACKGROUND

The present invention generally relates to computer systems, and more particularly, to a compute array of a processor with three-dimensional (3D) lane predication for matrix operations.

Numerical support within a processor can include mathematical operations to increase computational efficiency and throughput. Some mathematical operation instructions implemented within a processor can include combined operations, such as multiply-and-accumulate (MAC) operations (also referred to as multiply-add operations). MAC operations can be performed on scalars, vectors or matrices. Matrix math can be resource intensive and is often implemented using higher-level routines which take many cycles to execute. To illustrate, consider two reference square matrices, A and B, each having N rows and N columns. Multiplying A and B involves $O(N^3)$ MAC operations, producing an N×N matrix T. As an example, multiplying a 4×4 matrix by a 4×4 matrix would require 64 MAC operations (or more precisely, 64 multiply operations and 48 add operations).

SUMMARY

Embodiments of the invention are directed to a computer-implemented method for providing 3D lane predication for matrix operations. A non-limiting example of the method includes receiving, by a compute array of a processor, a first input matrix having m rows and k columns and a second input matrix having k rows and n columns. A three-dimensional predicate mask having an M-bit row mask, an N-bit column mask, and a K-bit rank mask is generated, where M, N, and K are the maximum size limits of the mask. A result matrix of up to m rows, up to n columns, and up to k rank updates is determined based on the first input matrix, the second input matrix, and the predicate mask, wherein m, n, and k are taken from the actual respective values of the first input matrix and the second input matrix.

Embodiments of the invention are directed to a processing system for providing 3D lane predication for matrix operations. A non-limiting example of the system includes an instruction fetch/decode unit operable to fetch and decode a plurality of instructions having at least one instruction to perform a plurality of linear algebra operations. The system further includes a dispatch/issue unit operable to dispatch the instructions to an issue queue after decoding and a compute array associated with the issue queue. The compute array is configured to perform a plurality of operations. The operations include receiving a first input matrix having m rows and k columns and a second input matrix having k rows and n columns. The operations further include generating a three-dimensional predicate mask having an M-bit row mask, an N-bit column mask, and a K-bit rank mask. A result matrix of up to m rows, up to n columns, and up to k rank updates is determined based on the first input matrix, the second input matrix, and the predicate mask.

Embodiments of the invention are directed to a computer program product for providing 3D lane predication for matrix operations. A non-limiting example of the computer program product includes a computer readable storage medium having program instructions embodied therewith, the program instructions executable by processing circuitry to perform a plurality of operations. The operations include receiving a first input matrix having m rows and k columns and a second input matrix having k rows and n columns. The operations further include generating a three-dimensional predicate mask having an M-bit row mask, an N-bit column mask, and a K-bit rank mask. A result matrix of up to m rows, up to n columns, and up to k rank updates is determined based on the first input matrix, the second input matrix, and the predicate mask.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
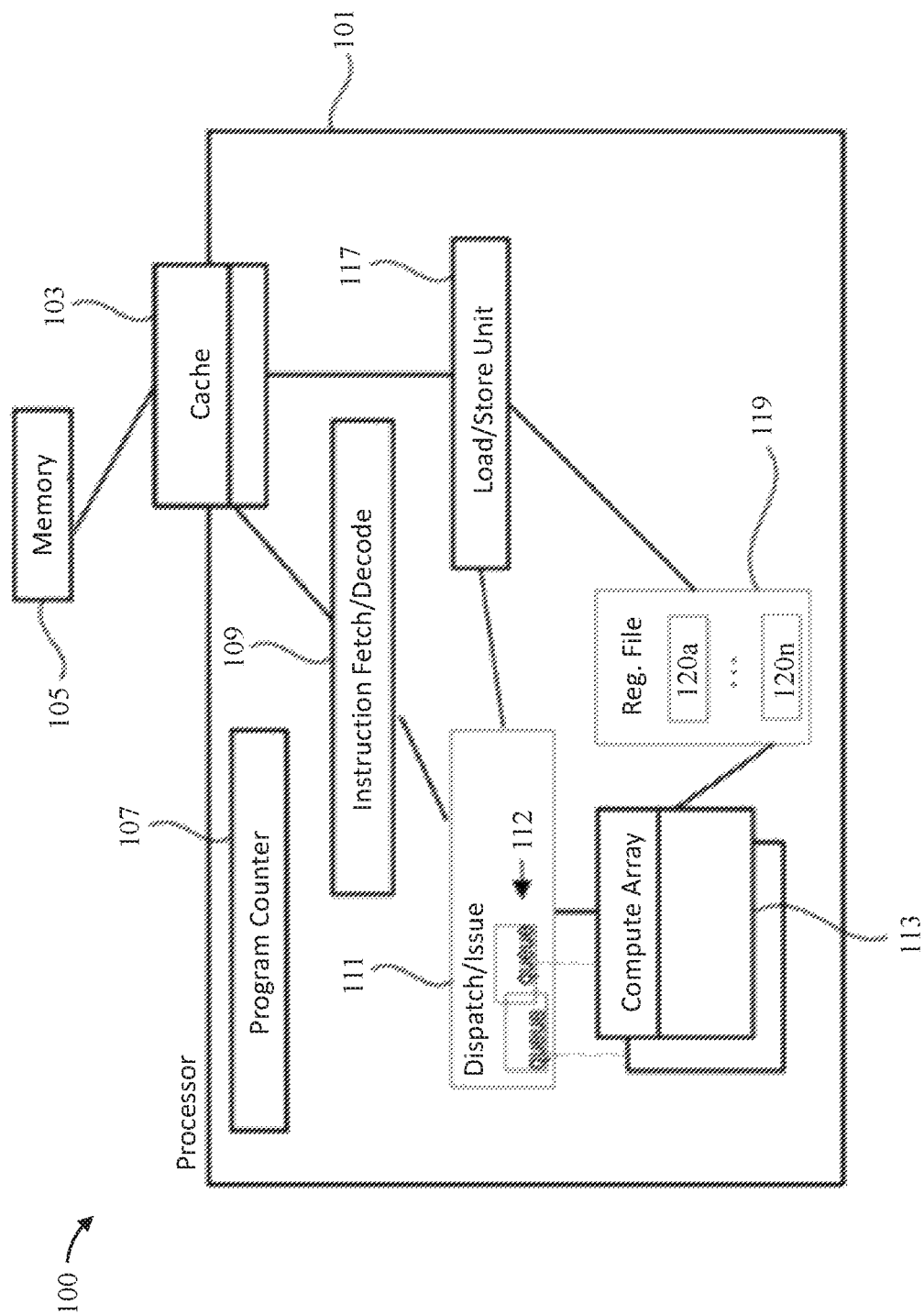
FIG. 1 is a block diagram illustrating a computer system in accordance with various embodiments of the invention.

The diagrams depicted herein are illustrative. There can be many variations to the diagrams or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number correspond to the figure in which its element is first illustrated.

DETAILED DESCRIPTION

It is understood in advance that although example embodiments of the invention are described in connection with a particular system architecture, embodiments of the invention are not limited to the particular architectures or materials described in this specification. Rather, embodiments of the present invention are capable of being implemented in conjunction with other processor architectures now known or later developed.

For the sake of brevity, conventional techniques related to making and using aspects of the invention may or may not be described in detail herein. In particular various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the present invention, matrix operations can be performed for many purposes, such as machine learning, image processing, and other technical applications. As discussed previously, matrix math can be resource intensive, requiring $O(N^3)$ MAC operations when multiplying two matrices A and B. Matrix multiply instructions are typically implemented in hardware using a reference N×N matrix, where N is fixed in the instruction set. This reference N×N matrix can then be used to solve matrix operations having matrices of arbitrary size, as larger dimension matrix-multiplication problems can be broken down into a series of sums of a series of smaller matrix-multiplication calculations.

With advances in computing, implementing full matrix-multiplication in a single instruction in hardware is becoming feasible, at least for moderately-sized matrices. The issue, however, is that source matrices can be defined in an arbitrary range of configurations, from smaller than the reference N×N matrix, to vastly larger matrices. When the dimensions of these larger matrices are not exact multiples of the implemented N×N matrix multiply instruction, the N×N matrix-multiply instruction can only be used for each of the N×N-dimension sub-blocks of the larger matrix operands—the N×N matrix-multiply instruction cannot be used for any residue sub-blocks smaller than N×N.

Now consider an outer-product operation that multiplies each of the N elements from one vector with each of the N elements from a second vector, producing an N×N result matrix populated with the respective products. Such an outer-product instruction, where each element-pair (an element from the first vector and an element from the second vector) is multiplied one-by-one, is known as a rank-1 update operation. Outer-product operations are useful for implementing a full matrix-multiplication, where a row (or portion of a row) of matrix A is contained in one vector and a column, or portion of a column, of matrix B is contained in the second vector. The product of row element i of A and column element j of B is placed into element i,j of the result matrix.

The concept of a rank-1 update can be generalized. As an extended form of this operation, a rank-K update of an outer-product operation would perform K outer-products, returning the summation of the outer-products into the result matrix. For our reference N×N matrices, a rank-N outer-product would perform the full N×N matrix-multiplication operation. While the outer-product operation can be considered a building block for a matrix-multiplication, it suffers the same issues discussed previously when the matrix size is not an exact multiple of the implemented outer-product instruction (e.g., reference N×N matrix).

Because an N×N matrix-multiply instruction or outer-product operation cannot be used for any residue sub-blocks smaller than N×N, these so-called residue sub-blocks are conventionally addressed separately. For example, when there are residue calculations that involve matrix operands having dimensions less than the implemented matrix-multiply instruction or the implemented outer-product instruction, these calculations would require using a sequence of lower-performing vector instructions, or using a sequence even lower-performing scalar instructions, to perform the residue calculations. This brute-force type of configuration degrades some of the performance opportunity provided by the implemented N×N matrix-multiply instruction or the N×N outer-product instruction. Perhaps even more importantly, for matrix-multiplication involving small matrix calculations, the implemented N×N matrix-multiply instruction cannot be employed at all.

To support arbitrary source matrix configurations, one solution could be to provide a unique instruction for each possible source matrix configuration up to the reference N×N matrix. Defining a unique matrix-multiplication instruction for every possible configuration of matrix operands up to the implemented N×N dimension can be impractical, however, for fixed-length and limited variable-length instructions, requiring $O(N^3)$ unique instruction encodings, one for each possible configuration of source matrix sizes.

For another possible solution, a predicate mask, similar to that employed in Single Instruction Multiple Data (SIMD) instruction set architecture extensions, could be employed to coerce a single N×N matrix multiply instruction to support any matrix size having less than or equal to N rows and less than or equal to N columns. Such a predicate mask would require $O(N^3)$ predicate bits, one for each multiply-add operation. This number of predicate bits quickly becomes impractical to include in an instruction encoding, even for moderate values of N. For example, 64 bits would be required for the relatively simple case of N=4.

Turning now to an overview of aspects of the present invention, one or more embodiments of the invention address the above-described shortcomings of the prior art by providing a new instruction set extension and a method for 3D lane predication for matrix operations. This new instruction set extension defines a fixed-size 2-dimensional register file containing N rows.

In some embodiments of the invention, each row contains N 32-bit elements (or N/2 64-bit elements). A set of outer-product instructions are defined to produce an N×N result matrix of 32-bit elements (or an N×N/2 result matrix of 64-bit elements) that is placed into this register file, with a variety of accumulation forms. In some embodiments of the invention, one or more outer-product instructions are defined as rank-K updates. Instead of producing a single N×N (or N×N/2) outer-product, these "rank-K" updates produce "K" N×N (or N×N/2) outer-products that are summed to implement a rank-K update of the N×N (or N×N/2) result matrix.

To support matrix multiplication on an m×k matrix and k×n matrix, where m≤M, n≤N, or k≤K (for rank-K instructions), this invention provides a multi-dimensional predicate mask. The predicate mask can include an N-bit row mask, an N-bit column mask, and a K-bit rank mask (due to the 3 parameters of the predicate mask, it can be thought of as a 3D predicate mask).

In some embodiments of the invention, the N-bit row mask is provided in the instruction encoding for the predicate mask. In the N-bit row mask, 1 bit is assigned for each row of the supported result matrix. In some embodiments of the invention, the N-bit column mask is provided in the instruction encoding for the predicate mask. In the N-bit column mask, 1 bit is assigned for each column of the supported result matrix. In some embodiments of the invention, the K-bit rank mask is provided in the instruction encoding to enable multi-rank outer-product instruction encoding. In the K-bit rank mask, 1 bit is assigned for each rank update supported by the instruction. Advantageously, instead of requiring $O(K \times N^3)$ predicate mask bits to support all source matrix configurations up to N×N and rank updates up to rank K, only $O(K+N \times 2)$ mask bits are required for a 3D predicate mask constructed in this manner.

For matrix results less than dimension N×N, row mask bits corresponding to valid result matrix rows are set to 1 and all other row mask bits are set to 0. Similarly, column mask bits corresponding to valid result matrix columns are set to 1 and all other column mask bits are set to 0. In some embodiments of the invention, calculation results are only saved in the rows and columns of the result matrix register file corresponding to row mask bits and column mask bits that are set to 1 and all other rows and columns of the result matrix register file are set to 0. For multi-rank update instructions, rank mask bits set to 0 cause the products corresponding to that rank update to be set to 0, while the products corresponding to rank mask bits set to 1 to be included in the summation with other enabled rank-update products. In this manner, the 3D predicate mask allows a single N×N result matrix to support single and multi-rank outer-product instruction encoding for arbitrary source matrix configurations.

Advantageously, a 3D predicate mask constructed in this manner supports (is agnostic to) Big-Endian byte ordering or Little-Endian byte ordering without additional overhead. In Big-Endian byte ordering the origin element [0,0] is defined as the upper left-hand element of the matrix register file. Conversely, in Little-Endian byte ordering the origin element [0,0] is defined as the lower right-hand element of the matrix register file.

One or more embodiments of the present invention provide technological improvements over current methods of performing arbitrary source matrix operations. As discussed previously, current methods are forced to use lower-performing vector instructions or scalar instructions to perform residue calculations. Current methods that attempt to avoid these residual calculations carry their own disadvantages, including requirements for $O(N^4)$ unique instruction encodings (one for each possible configuration of source matrix sizes) or $O(N^3)$ predicate bits (one for each multiply-add operation). One or more embodiments of the present invention provide technical solutions to one or more of these disadvantages of existing solutions by proposing a 3D predicate mask that enables a single N×N result matrix to support single and multi-rank outer-product instruction encoding for arbitrary source matrix configurations.

Embodiments of the invention can include one or more compute arrays in a processor, where each compute array includes a plurality of compute elements configured to perform one or more multiply-and-accumulate (MAC) operations. Collectively, the compute elements can perform a plurality of linear algebra operations in parallel. The linear algebra operations can include matrix MAC operations that multiply two matrices and accumulate the results. The linear algebra operations can be performed for many purposes, such as machine learning, image processing, and other technical applications. By increasing the efficiency of linear algebra operations and supporting mixed-precision operations, exemplary embodiments can result in improved processing system performance and flexibility to cover a wider range of mathematical operations within hardware rather than relying upon more high-level routines executing with greater processing overhead.

As one example, a compute array of exemplary embodiments can compute a matrix MAC operation, such as multiplying a first input matrix (A) with a second input matrix (B) and accumulating the result in a result matrix (C), as illustrated by the following equation (1):

$$C_{ij} = \Sigma A_{ki} * B_{jk} \quad \text{Equation (1)}$$

In the above equation (1), the subset of MAC operations may include the sum of products $\Sigma(A_{ki}*B_{jk})$, for a given value of k. For example, if A, B, and C are 4×4 matrices, a subset of MAC operations may comprise 4 MAC operations A11*B11, A21*B12, A31*B13, and A41*B14 for obtaining element C11. Each group of one or more MAC operations that can be performed by a compute element, in one clock cycle, may be performed by executing a processor instruction. The processor instruction may, for example, be executed in parallel by multiple compute elements in a compute array. For example, the set of MAC operations can include N MAC operations to be performed by one compute array of compute elements and other N MAC operations to be performed by another compute array of compute elements. The two compute arrays may be configured to consecutively perform each pair of MAC operations in parallel (e.g., if N=3, 3 pairs of MAC operations may consecutively be performed in parallel). This may particularly be advantageous if each compute element includes a single accumulator that is used to store one element. The accumulator may be a register. In another example, the accumulator may include multiple fields or accumulator elements (e.g., m elements), where each accumulator element may be used to accumulate results of respective MAC operations. In this case, the compute array may be configured to perform m MAC operations in parallel in one clock cycle.

If more than one accumulator exists in each compute array, a pipelined execution of the instructions may be used. According to an embodiment, each compute element of the compute array can be configured to perform a respective MAC operation in at least one clock cycle. The MAC operation execution may, for example, include four clock cycles to generate the result of the processor instruction. The processor instruction may include four steps, where each step contributes to obtain the overall result of the processor instruction being processed. In a sequence of clock cycles, a new processor instruction may be started using a different accumulator register. As soon as the result of the instruction is available, e.g., after 4 cycles, the accumulator used by the first instruction can be used again by a subsequent instruction. According to an embodiment, the processor instructions can be decoded in one clock cycle.

According to an embodiment, an index used for the computations can be an architected accumulator register index of the accumulator of a compute array. This may save processing resources because the same index can be used to index both the accumulator and the compute array that comprises the accumulator. This is by contrast to another implementation that would require separate indexing of the compute array and the accumulators.

According to an embodiment, a processor can include a dispatch and/or issue unit. The dispatch and/or issue unit can be configured to process multiple processor instructions, select compute arrays using the index and send the processor instructions to the selected compute arrays for performing a set of MAC operations or other such linear algebra operations. This may enable a seamless integration in existing systems by making minimal changes to existing dispatch and/or issue units.

According to an embodiment, each processor instruction can include operands indicating the accumulator as a source and target register of the instruction and indicating further registers, of the other register file, including source data to be multiplied and accumulated. The source data can include numbers to be operated upon. Using the accumulator as a source and target register can enable a resource saving access to data. This is by contrast to a compute array using two separate accumulators, one for writing and one for reading data, which may introduce extra latencies and additional source-target dependency tracking logic. Due to the reduced connectivity in a processor unit using a single accumulator (e.g., by placing a single accumulator near the execution unit), the single accumulator can be accessed multiple times faster than accessing separate accumulators.

According to an embodiment, compute arrays can be part of the dispatch and/or issue unit. This may save area on a chip and power compared to a separate implementation of the compute arrays. For example, in case the compute arrays are implemented as separate components of the dispatch and/or issue unit, the compute arrays may occupy more space and may use extra power sources.

Referring now to FIG. 1, a block diagram illustrating a structure of a processing system 100 including processor 101 is depicted in accordance with an embodiment. The processing system 100 may enable storing data for performing operations on the stored data. According to an embodiment, one or more levels of a cache 103 of the processing system 100 may be employed to buffer memory data in order to improve processor performance. The cache 103 may include a high-speed buffer holding cache lines of memory data that are likely to be used. For example, typical cache lines may include 64, 128, or 256 bytes of memory data. According to an embodiment, the cache 103 may be configured to cache data of higher hierarchical storage, such as a main memory storage 105.

According to an embodiment, the processor 101 may further include a register file 119 with registers 120a-n. The registers 120a-n may, for example, include general-purpose registers that each includes a number of bits to store data items processed by instructions executed in the processor 101.

According to an embodiment, the instructions may be provided by a compiler. For example, source code of a program may be compiled into a series of machine-executable instructions defined in an instruction set architecture ("ISA") associated with the processing system 100. The ISA may include at least one processor instruction defined in accordance with at least one embodiment of the present disclosure. The instructions of the ISA may be provided to process data stored in memory 105 and/or in the registers 120a-n of the register file 119 of the processor 101. According to one embodiment, when the processor 101 starts to execute the executable instructions, these machine-executable instructions may be placed in order to be executed sequentially.

According to an embodiment, an instruction fetch/decode unit 109 may be employed to fetch placed instructions. For example, the instruction fetch/decode unit 109 may fetch the next sequential instructions, the target instructions of branch taken instructions, or the first instructions of a program following a context switch. The fetched instructions may be decoded by the instruction fetch/decode unit 109.

According to an embodiment, the decoded instruction(s) may be passed to a dispatch/issue unit 111. The dispatch/issue unit 111 may deposit the instructions in one or more issue queues 112, where the instructions may wait for source operands and an appropriate compute array 113 of the processor 101 to become available. For example, each compute array 113 of the compute arrays 113 may be associated with an issue queue 112 such that instructions to be executed by the compute array 113 may be queued in the issue queue 112 associated with the compute array 113. The dispatch/issue unit 111 may deposit the instructions in an issue queue 112 based on an index that is assigned to the compute array 113 of the issue queue 112. This index may be part of the instructions. That is, by reading the index from an instruction, the dispatch/issue unit 111 may know (e.g., determine) which compute array 113 can execute the instruction. Each compute array 113 of the compute arrays 113 may be configured to execute one respective type of instruction which may not be executed by other compute arrays 113. In one embodiment, a type of an instruction may be defined by the registers associated with the instruction.

In some embodiments of the invention, every execution unit may be implemented to execute every instruction (e.g., any instruction can go to any execution unit). However, this approach may be more expensive in terms of processing resources.

According to an embodiment, each issue queue 112 may include window logic which may be responsible for monitoring dependencies between instructions in the queue and issuing instructions to the respective compute array 113. The window logic may include wakeup logic and select logic. The wakeup logic may be responsible for invoking instructions waiting in the issue queue 112 for the source operands to become available. Once all the source operands of an instruction are available, the instruction may be flagged ready for execution. The select logic may be responsible for selecting instructions for execution from the pool of ready instructions. An instruction may be ready if all of its source operands are available. Then the operand values of the instruction may be loaded from the memory 105 and/or registers using a load/store unit 117.

A compute array 113 may receive information about instructions from the dispatch/issue unit 111 and may perform operations on operands according to the operation code of the instruction. Operands are provided to the compute array 113 from registers in accordance with the present disclosure. Results of the execution, when stored, may be stored either in memory 105 and/or registers 119. According to an embodiment, each compute array 113 may include multiple compute elements with at least one multiplier and at least one adder. Each multiplier of the compute array 113 may be configured to perform the product of two numbers and the adder may be configured to add the product to the content of an accumulator associated with the multiplier or to a content of an accumulator element associated with the multiplier. The compute array 113 may be configured to perform multiple MAC operations in parallel in at least one clock cycle. In one example, the compute array 113 may include an X number of multipliers that may enable the compute array 113 to perform an X number of MAC operations or other linear algebra operations in at least one clock cycle.

According to an embodiment, a program counter (instruction counter) 107 may keep track of the address of the current instruction to be executed. For example, a program counter 107 in processor, such as, a z/Architecture® (z/Architecture and all IBM-based trademarks and logos are trademarks or registered trademarks of International Business Machines Corporation and/or its affiliates) processor may include 64 bits and may be truncated to 31 or 24 bits to support prior addressing limits. A program counter 107 may be embodied in a program status word ("PSW") of a computer such that it persists during context switching. In an embodiment, the program counter may be incremented by an amount equal to the number of bytes of the current instruction.

The processing system 100 may be configured to perform a pipelined execution of the instructions. For example, a four-cycle latency pipelined execution may be used by each compute array 113 of the processor 101 such that each instruction may take the compute array 113 four clock cycles to produce the result of the linear algebra operations. For that, the execution of the instruction at the compute array 113 may be broken down into four processes, where one of the four processes may include a multiplication process and another of the four processes may include the accumulation process.

According to one embodiment, the processing system 100 may be configured to operate in an ST mode, an SMT2 mode, or an SMT4 mode. In ST mode, MAC operations from one thread may be performed or handled at a time by the compute arrays 113. For example, in the ST mode, each of the compute arrays 113 may be configured so that the compute arrays 113 receive instructions from one specific thread (e.g., T0). In SMT2 mode, the compute arrays 113 may receive instructions from any one of two threads. For example, in the SMT2 mode, each of the compute arrays 113 may be configured so that the compute arrays 113 receive instructions from thread T0 and/or thread T1. In SMT4 mode, each compute array 113 may receive processor instructions from all four threads (e.g., T0, T1, T2 and T3) or the compute array 113 may operate in a split mode to receive two threads. For example, in split mode, if the processing system 100 includes two compute arrays 113, one compute array 113 may be configured to process instructions from thread T0 and/or thread T2 and the other compute array 113 may be configured to process instructions from thread T1 and/or thread T3.

Thus, the processing system 100 may enable processing instructions from one or more programs using compute arrays 113. For example, the source code of a program may implement one or more MAC operations. A MAC operation may include multiplying two numbers and adding the result of the multiplication to an accumulated value. At least one MAC operation may be performed by the compute array 113 by executing a respective processor instruction of the ISA.

Figure 2:
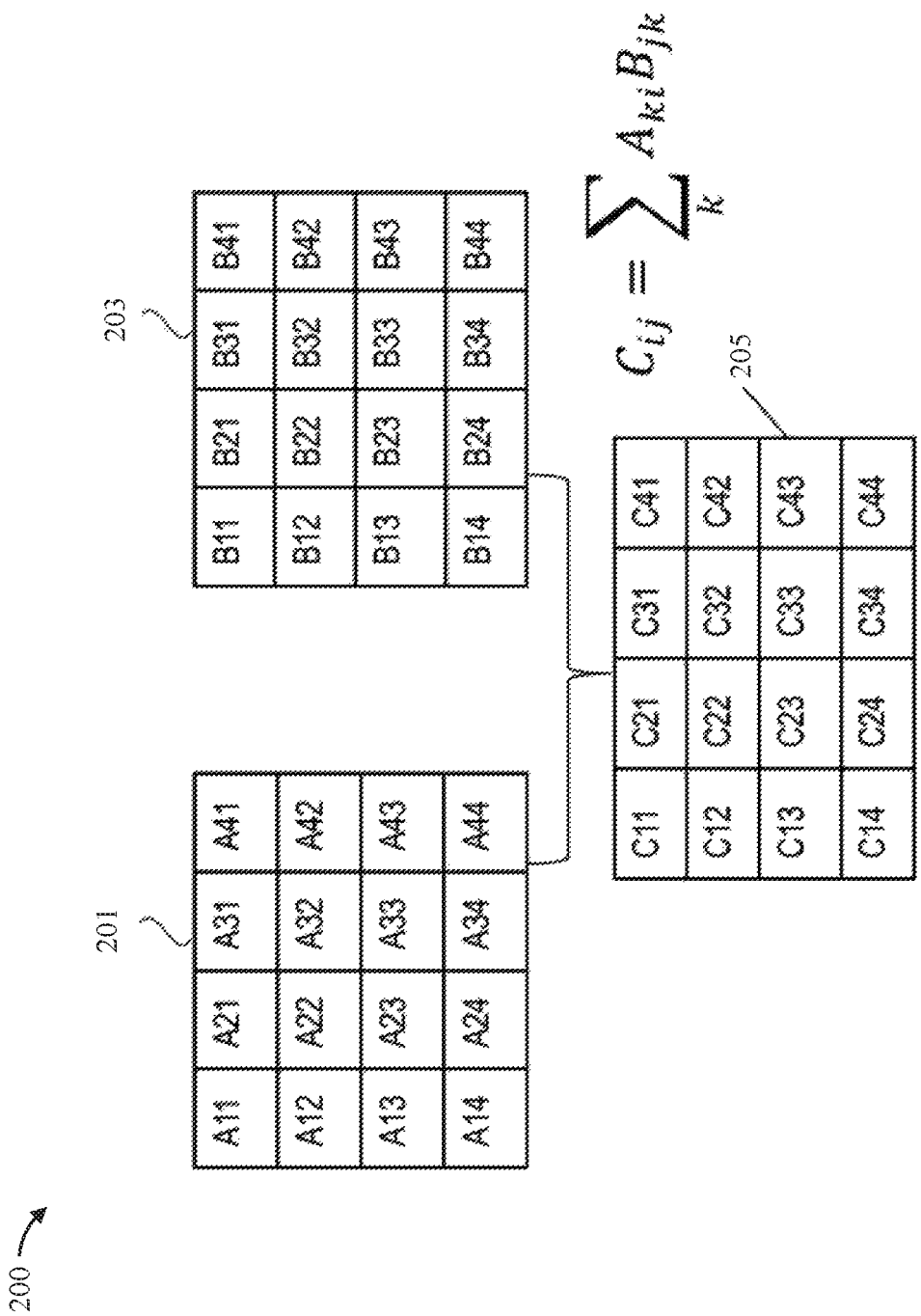
FIG. 2 is a block diagram illustrating an exemplary matrix operation according to a non-limiting embodiment.

According to one embodiment, the matrix operation 200 of FIG. 2 may be referred to as a matrix multiply and accumulate ("MMA") operation. The matrix operation 200 may multiply a first input matrix 201 by a second input matrix 203, and the accumulated result may include a result matrix 205. If the first input matrix 201 includes an M-by-K matrix as a first shape and the second input matrix 203 includes a K-by-N matrix as a second shape, then the result matrix 205 may include an M-by-N matrix as a result shape. Thus, each element of the result matrix 205 may be obtained by K MAC operations. As shown in FIG. 2, the first input matrix 201 may include a 4×4 matrix and the second input matrix 203 may include a 4×4 matrix. According to an embodiment, the matrix operations may not be limited to the dimensions illustrated in FIG. 2, which are provided as examples. As used herein, the term "shape" may be used to define matrix dimensions. The term "precision" may be used to define a number of bits included in each element, such as 4-bits, 8-bits, 16-bits, 32-bits, 64-bits, etc. Further, computations can be performed using fixed-point or floating-point formats.

One or more accumulators may be used for computing the MAC operations and storing elements of the result matrix 205. An accumulator may have an accumulator size, e.g., 512 bits, indicating a predetermined size of the accumulator. An accumulator may include multiple accumulator elements or fields. An accumulator element may have an accumulator element size which may be smaller than the accumulator size, e.g., an accumulator element size may be 32 bits. Each accumulator element of the accumulator may have or occupy respective number of bits of the accumulator, e.g., a first accumulator element may occupy bits 0 to 31 of the accumulator, the second accumulator element may occupy bits 32 to 63, and the sixteenth accumulator element may occupy the bits 480 to 511. In an embodiment, the accumulator element size may be defined as the size of an element of the result matrix 205. This may be advantageous as the accumulator may be configured to include as many accumulator elements as the number of elements in the result matrix 205. This may enable storing all elements of the result matrix 205 in one accumulator.

Figure 3:
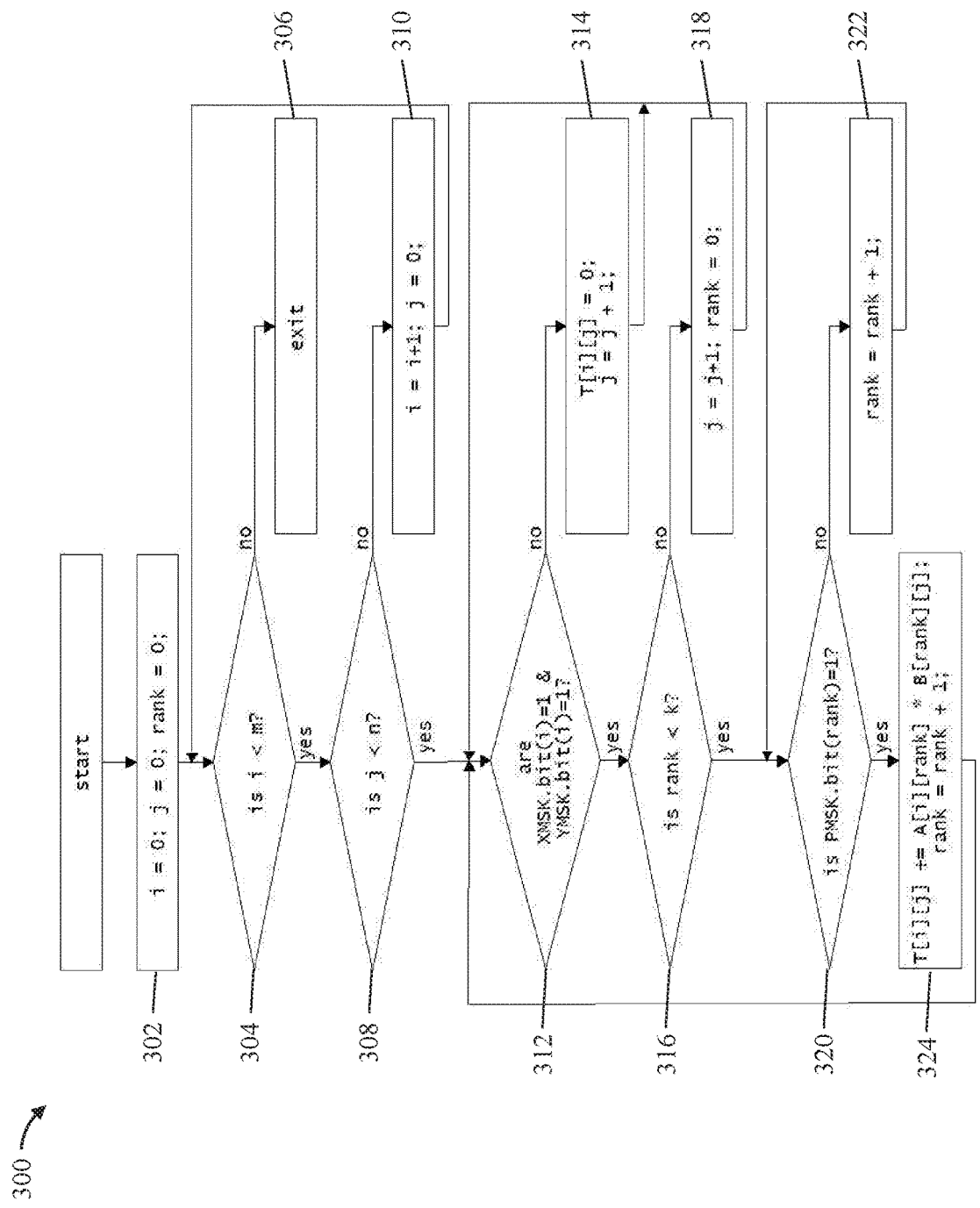
FIG. 3 is a block diagram for an instruction set that supports 3D lane predication for matrix operations according to one or more embodiments of the invention.

FIG. 3 depicts a block diagram 300 for an instruction set that supports 3D lane predication for matrix operations according to one or more embodiments described herein. In some embodiments of the invention, the instruction set encoded in the block diagram 300 illustrates a dataflow that supports any outer outer-product up to m rows, up to n columns, and up to k rank updates using a set of masks (e.g., a 3D predicate mask that includes a row mask "XMSK", a column mask "YMSK", and a rank mask "PMSK"). The values of m, n, and k are fixed constants in a given instruction implementation that define the maximum rows (m), columns (n), and rank (k) supported in the result matrix, but these values can be arbitrarily large depending on the given application. In some embodiments of the invention, the block diagram 300 and the associated instruction set are executed using the compute array 113 described with respect to FIG. 1, although other implementations are within the contemplated scope of the invention. As discussed previously, employing this set of masks also permits supporting either a Big-Endian representation in the result matrix register (i.e., element T[0][0] located in the top left element) or a Little-Endian representation (i.e., element T[0][0] located in the bottom rightmost element).

At block 302 the instruction set initializes i (row index) to 0, j (column index) to 0, and r (rank index) to 0 for a given matrix operation. At block 304 the current value of i is compared to m (the number of implemented rows in the result matrix). If i is not less than m, the instruction proceeds to block 306 and terminates as complete (i now exceeds the maximum supported rows m in the result matrix and further computation is meaningless).

If i is less than m, the instruction set proceeds to block 308 and the current value of j is compared to n (the number of implemented columns in the result matrix). If j is not less than n, row i of the result matrix is completed and the instruction proceeds to block 310. At block 310, i is incremented (i=i+1) to point to the next row and j is set to 0. The instruction set then returns to block 304.

If j is less than n, the instruction set proceeds to block 312. At block 312 the value of bit i of the row mask (XMSK.bit (i)) and the value of bit j of the column mask (YMSK.bit(i)) are read. If XMSK.bit(i)=0 or YMSK.bit(i)=0, the instruction proceeds to block 314, where the result matrix element T[i][j] is set to 0 and j is incremented (j=j+1). The instruction set then returns to block 312.

If XMSK.bit(i)=1 and YMSK.bit(i)=1 is true, the instruction set proceeds to block 316, where r is compared to k. If r is not less than k, the instruction set proceeds to block 318, where j is incremented (j=j+1) and r is set to 0. The instruction set then returns to block 312.

If r is less than k, the instruction proceeds to block 320, where the value of bit r in the rank mask (PMSK.bit(r)) is read. If PMSK.bit(r)=1 is false, the instruction set proceeds to block 322, where r is incremented (r=r+1). The instruction set then returns to block 320.

If PMSK.bit(r)=1 is true, the instruction set proceeds to block 324, where the outer-product is computed and added to the value stored in the target matrix (T[i][j]+=A[i][r]*B[r][j]. The value for r is then incremented (r=r+1) and the instruction set returns to block 312.

Advantageously, while this instruction set can be implemented to support k rank updates of an outer-products of m-element rows of matrix A and n-element columns of matrix B, the masks XMSK, YMSK, and RMSK enable a single instruction to support any combination of outer-products. In other words, this single instruction can handle matrix operations from 1 to k elements of 1 to m rows of matrix A and from 1 to k elements of 1 to n columns of matrix B. Further, instead of requiring k×m×n mask bits using traditional methods of masking, only k+m+n mask bits are required. As such, the implemented values of k, m, and n need not be exact multiples of the dimensions of the matrices being operated on, greatly simplifying (less mask bits and no dimensionality requirement) and speeding up (no residuals) the computing of matrix operations.

The instruction set shown with respect to FIG. 3 can also be represented as a set of pseudocode for performing a matrix multiplication of a matrix A (M rows×K columns) and a matrix B (K rows×N columns) to compute a target matrix T (M rows×N columns).

For example, modifications to an outer product instruction to support less than k rank updates when k is a fixed, constant value can be represented by the following pseudocode:

```
for (i=0; i<m; i++)         // m is fixed and less than M
  for (j=0; j<n; j++)       // n is fixed and less than N
    for (r=0; r<k; r++)     // k is fixed and less than K
      if (PMSK.bit(r)==1)
        T[i][j] += A[i][r] * B[r][j];
      else T[i][j] += 0.
```

Continuing the above example, modifications to an outer product instruction to support less than m rows when m is a fixed, constant value can be represented by the following pseudocode:

```
for (i=0; i<m; i++)         // m is fixed and less than M
  for (j=0; j<n; j++)       // n is fixed and less than N
    if (XMSK.bit(i)==1)
      for (r=0; r<k; r++)   // k is fixed and less than K
        T[i][j] += A[i][r] * B[r][j];
    else T[i][j] = 0.
```

Further continuing the above example, modifications to an outer product instruction to support less than n columns when n is a fixed, constant value can be represented by the following pseudocode:

```
for (i=0; i<m; i++)         // m is fixed and less than M
  for (j=0; j<n; j++)       // n is fixed and less than N
    if (YMSK.bit(j)==1)
      for (r=0; r<k; r++)   // k is fixed and less than K
        T[i][j] += A[i][r] * B[r][j];
    else T[i][j] = 0.
```

Completing the above example, this set of pseudocode can be combined and represented as a single outer product instruction that supports less than k rank updates, less than m rows, and less than n columns when k, m, and n are fixed, constant values using the following pseudocode:

```
for (i=0; i<m; i++) {                            // m is fixed and less than M
  for (j=0; j<n; j++) {                          // n is fixed and less than N
    if ((XMSK.bit(i)==1) && (YMSK.bit(j)==1)) {
      for (r=0; r<k; r++) {                      // k is fixed and less than K
        if (PMSK.bit(r)==1)
          T[i][j] += A[i][r] * B[r][j];
        else T[i][j] += 0;
    else T[i][j] = 0.
```

Figure 4:
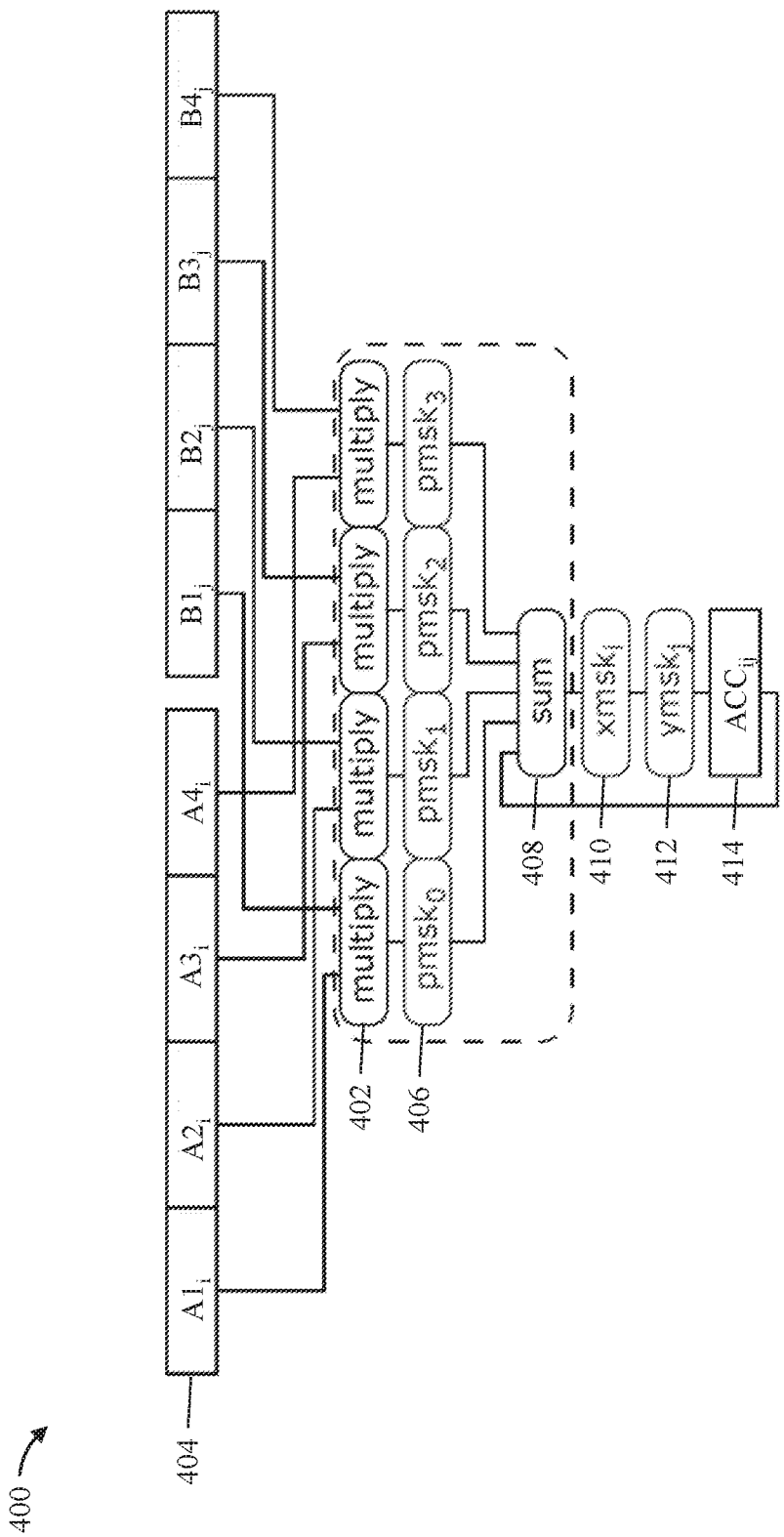
FIG. 4 is a block diagram of logic elements that support 3D lane predication for matrix operations according to one or more embodiments of the invention.

FIG. 4 depicts a block diagram 400 of logic elements that support 3D lane predication for matrix operations according to one or more embodiments. In some embodiments of the invention, each of the logic elements depicted in block diagram 400 can be implemented in hardware (using, e.g., the system configuration shown in FIG. 1). For example, the "multiply" and "sum" operations can be performed using a compute array configured for matrix MAC operations (e.g., the compute array 113 shown in FIG. 1). Continuing the example, the mask values (e.g., $pmsk_0$, $xmsk_i$, etc.) can be stored in a register file. This register file can include an N-bit row mask, an N-bit column mask, and a K-bit rank mask.

As shown in FIG. 4, multipliers 402 compute the values of the multiply operation for each corresponding pair of matrix elements 404. For example, one multiplier computes the value of $A1_i$ and $B1_j$, while another multiplier computes the value of $A2_i$ and $B2_j$.

In some embodiments of the invention, a rank mask 406 is applied to the output of each of the multipliers 402. In some embodiments of the invention, the rank mask 406 includes a number of rank mask bits equal to the number of multipliers (e.g., $pmsk_0$ . . . $pmsk_3$). In some embodiments of the invention, for each rank update k, $pmsk_k$ forces the result of the corresponding multiplier 402 to 0 when the value of the rank mask 406 bit k is equal to 0.

As further shown in FIG. 4, the output values from each of the multipliers 402 (modified by each respective bit in the rank mask 406) are summed by an adder 408. In some embodiments of the invention, the output from the adder 408 is filtered through a row mask 410 and a column mask 412.

In some embodiments of the invention, the row mask 410 includes a number of row mask bits equal to the maximum number of rows in the target matrix, as described previously herein. In this manner, $xmsk_i$ denotes the ith row mask bit. In some embodiments of the invention, for each result row i, a value of 0 for $xmsk_i$ forces the adder 408 result to 0.

In some embodiments of the invention, the column mask 412 includes a number of column mask bits equal to the maximum number of columns in the target matrix, as described previously herein. In this manner, $ymsk_j$ denotes the jth column mask bit. In some embodiments of the invention, for each result column j, a value of 0 for $ymsk_j$ forces the adder 408 result to 0.

In some embodiments of the invention, the output value of the adder 408 is passed to an accumulator 414 after being filtered by the row mask 410 and the column mask 412. In this manner, the accumulator 414 will progressively compute the corresponding value for each element in the target matrix, as discussed previously herein. Moreover, while FIG. 4 depicts 20 MAC operations (16 multiply, 4 sum) on elements $A1_i$ . . . $A4_i$ and $B1_j$ . . . $B4_j$ for ease of illustration, it is understood that the complete matrix operation would include MAC operations for all elements of the source matrices A and B (i.e., MAC operations for all $A_{ki}$ and $B_{jk}$ elements).

Figure 5:
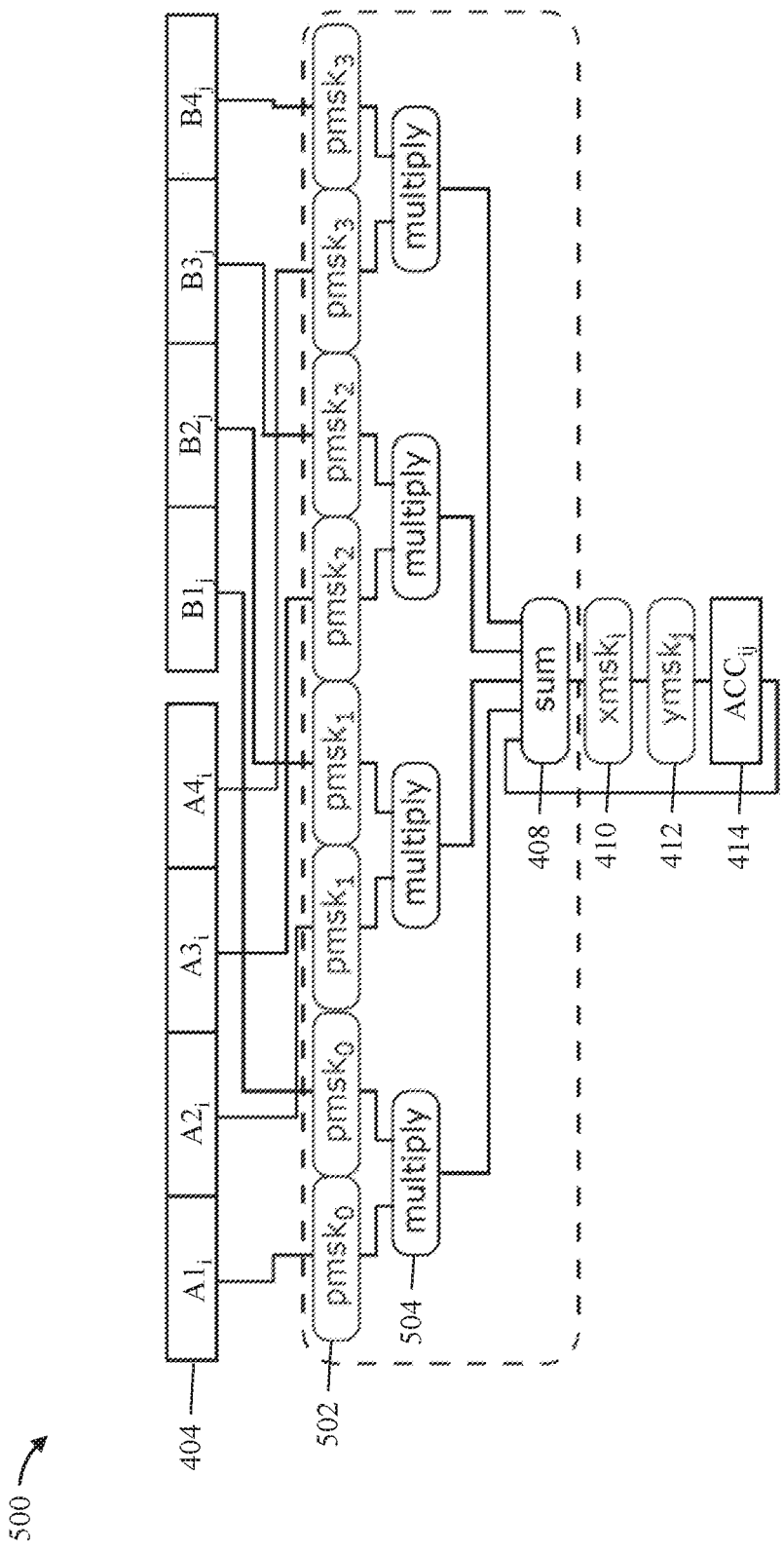
FIG. 5 is a block diagram of logic elements that support 3D lane predication for matrix operations according to one or more embodiments of the invention.

FIG. 5 depicts a block diagram 500 of logic elements that support 3D lane predication for matrix operations according to one or more embodiments. The block diagram 500 depicts an alternative embodiment with respect to the block diagram 400. In the block diagram 500, a rank mask 502 is applied to both inputs of each of the multipliers 504 (rather than to the multiplier outputs, as shown in FIG. 4).

In some embodiments of the invention, for each rank update k, $pmsk_k$ forces the inputs of a given multiplier to 0 when the rank mask 502 bit k is equal to 0. This in turn will cause the output of the corresponding multiplier to be 0. Advantageously, this configuration is useful when the timing of a particular multiply-sum implementation cannot permit the additional delay of the rank mask 502 function which would result if the rank mask was inserted between the multipliers 504 and the adder 408 (i.e., between multiply and add operations).

The output values from each of the multipliers 502 are summed by the adder 408, filtered using the row mask 410 and the column mask 412, and then passed to the accumulator 414 in a similar manner as described with respect to FIG. 4.

Figure 6:
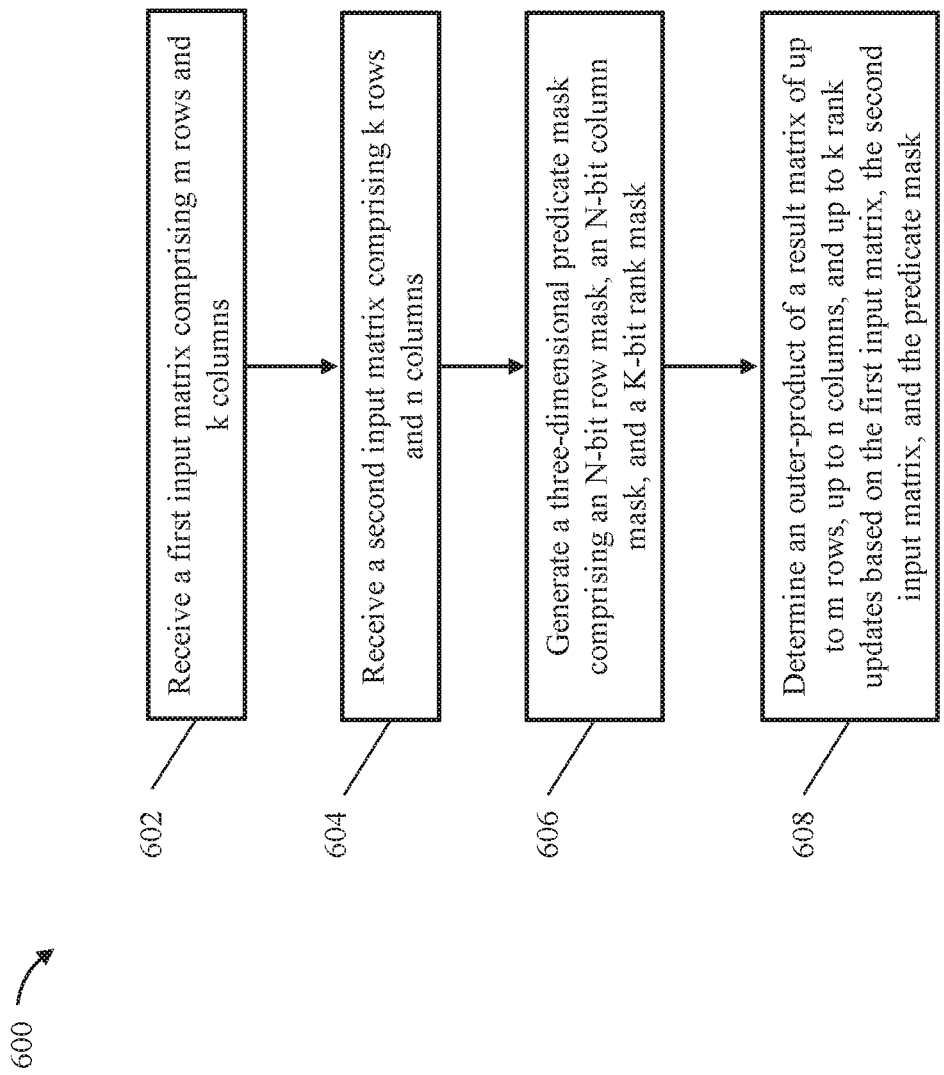
FIG. 6 depicts a flow diagram illustrating a method according to one or more embodiments of the invention.

FIG. 6 depicts a flow diagram 600 illustrating a method for providing 3D lane predication for matrix operations according to one or more embodiments of the invention. As shown at block 602, a first input matrix having m rows and k columns is received by a compute array of a processor. At block 604, a second input matrix having k rows and n columns is received by the compute array of the processor.

At block 606, a three-dimensional predicate mask is generated. When multiplying an M×K matrix A by a K×N matrix B, producing an M×N result matrix, the predicate mask can include an M-bit row mask, an N-bit column mask, and a K-bit rank mask. In some embodiments of the invention, for matrix results less than dimension M×N, row mask bits in the M-bit row mask corresponding to valid result matrix rows are set to 1 and all other row mask bits are set to 0. In some embodiments of the invention, for matrix results less than dimension M×N, column mask bits in the N-bit column mask corresponding to valid result matrix columns are set to 1 and all other columns mask bits are set to 0.

In some embodiments of the invention, for multi-rank update instructions, rank mask bits in the K-bit rank mask set to 0 cause the outer-products corresponding to that rank update to be set to 0. In some embodiments of the invention, outer-products corresponding to rank mask bits in the K-bit rank mask set to 1 are included in a summation with other enabled rank-update products.

In some embodiments of the invention, the K-bit rank mask is applied to an output of each multiplier of the compute array. In some embodiments of the invention, the K-bit rank mask is applied to both inputs of each multiplier of the compute array.

At block 608, the compute array determines a result matrix of up to m rows, up to n columns, and up to k rank updates based on the first input matrix, the second input matrix, and the predicate mask. In some embodiments of the invention, m and n are less than or equal to M, N and k is less than or equal to K. In some embodiments of the invention, the result matrix is configured to store results of an outer-product operation.

The method can further include storing the result matrix in an accumulator.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Similarly, the term "coupled" and variations thereof describes having a communications path between two elements and does not imply a direct connection between the elements with no intervening elements/connections between them. All of these variations are considered a part of the specification. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, are used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (e.g., rotated 90 degrees or at other orientations), and the spatially relative descriptors used herein should be interpreted accordingly.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a compute array of a processor, a first input matrix comprising m rows and k columns;
   receiving, by the compute array, a second input matrix comprising k rows and n columns;
   defining a three-dimensional predicate mask comprising an M-bit row mask, an N-bit column mask, and a K-bit rank mask in an instruction set extension for matrix operations, wherein M, N, and K are fixed constants; and
   determining, by the compute array, a result matrix of up to m rows, up to n columns, and up to k rank updates based on the first input matrix, the second input matrix, and the predicate mask, wherein m is less than or equal to M, n is less than or equal to N, and k is less than or equal to K;
   wherein determining the result matrix comprises performing a plurality of linear algebra operations in parallel, wherein the linear algebra operations include matrix multiply-and-accumulate (MAC) operations; and
   wherein the three-dimensional predicate mask supports all source matrix configurations up to size M×N and rank updates up to rank K using O(K+N+M) mask bits.

2. The computer-implemented method of claim 1, wherein, for matrix results less than dimension M×N, row mask bits in the M-bit row mask corresponding to valid result matrix rows are set to 1 and all other row mask bits are set to 0.

3. The computer-implemented method of claim 2, wherein, for matrix results less than dimension M×N, column mask bits in the N-bit column mask corresponding to valid result matrix columns are set to 1 and all other columns mask bits are set to 0.

4. The computer-implemented method of claim 3, wherein, for multi-rank update instructions, rank mask bits in the K-bit rank mask set to 0 cause the outer-products corresponding to that rank update to be set to 0.

5. The computer-implemented method of claim 4, wherein outer-products corresponding to rank mask bits in the K-bit rank mask set to 1 are included in a summation with other enabled rank-update products.

6. The computer-implemented method of claim 1 further comprising storing the outer-product of the result matrix in an accumulator.

7. The computer-implemented method of claim 1, wherein the K-bit rank mask is applied to an output of each multiplier of the compute array.

8. The computer-implemented method of claim 1, wherein the K-bit rank mask is applied to both inputs of each multiplier of the compute array.

9. A processing system comprising:
   an instruction fetch/decode unit operable to fetch and decode a plurality of instructions comprising at least one instruction to perform a plurality of linear algebra operations, wherein the at least one instruction comprises an instruction set extension for matrix operations that defines a three-dimensional predicate mask comprising an M-bit row mask, an N-bit column mask, and a K-bit rank mask in, wherein M, N, and K are fixed constants;
   a dispatch/issue unit operable to dispatch the instructions to an issue queue after decoding; and
   a compute array associated with the issue queue and configured to perform a plurality of operations comprising:
      receiving a first input matrix comprising m rows and k columns;
      receiving a second input matrix comprising k rows and n columns; and
      determining an outer-product of a result matrix of up to m rows, up to n columns, and up to k rank updates based on the first input matrix, the second input matrix, and the predicate mask, wherein m is less than or equal to M, n is less than or equal to N, and k is less than or equal to K;
   wherein determining the outer-product of the result matrix comprises performing a plurality of linear algebra operations in parallel, wherein the linear algebra operations include matrix multiply-and-accumulate (MAC) operations; and
   wherein the three-dimensional predicate mask supports all source matrix configurations up to size M×N and rank updates up to rank K using O(K+N+M) mask bits.

10. The processing system of claim 9, wherein, for matrix results less than dimension M×N, row mask bits in the M-bit row mask corresponding to valid result matrix rows are set to 1 and all other row mask bits are set to 0.

11. The processing system of claim 10, wherein, for matrix results less than dimension M×N, column mask bits in the N-bit column mask corresponding to valid result matrix columns are set to 1 and all other columns mask bits are set to 0.

12. The processing system of claim 11, wherein, for multi-rank update instructions, rank mask bits in the K-bit rank mask set to 0 cause the outer-products corresponding to that rank update to be set to 0.

13. The processing system of claim 12, wherein outer-products corresponding to rank mask bits in the K-bit rank mask set to 1 are included in a summation with other enabled rank-update products.

14. The processing system of claim 9 further comprising storing the outer-product of the result matrix in an accumulator.

15. A computer program product comprising a computer readable storage medium having program instructions embodied therewith, the program instructions executable by processing circuitry to perform a plurality of operations comprising:
   receiving a first input matrix comprising m rows and k columns;
   receiving a second input matrix comprising k rows and n columns;
   defining a three-dimensional predicate mask comprising an M-bit row mask, an N-bit column mask, and a K-bit rank mask in an instruction set extension for matrix operations, wherein M, N, and K are fixed constants; and
   determining an outer-product of a result matrix of up to m rows, up to n columns, and up to k rank updates based on the first input matrix, the second input matrix, and the predicate mask, wherein m is less than or equal to M, n is less than or equal to N, and k is less than or equal to K;
   wherein determining the outer-product of the result matrix comprises performing a plurality of linear algebra operations in parallel, wherein the linear algebra operations include matrix multiply-and-accumulate (MAC) operations; and
   wherein the three-dimensional predicate mask supports all source matrix configurations up to size M×N and rank updates up to rank K using O(K+N+M) mask bits.

16. The computer program product of claim 15, wherein, for matrix results less than dimension M×N, row mask bits in the M-bit row mask corresponding to valid result matrix rows are set to 1 and all other row mask bits are set to 0.

17. The computer program product of claim 16, wherein, for matrix results less than dimension M×N, column mask bits in the N-bit column mask corresponding to valid result matrix columns are set to 1 and all other columns mask bits are set to 0.

18. The computer program product of claim 17, wherein, for multi-rank update instructions, rank mask bits in the K-bit rank mask set to 0 cause the outer-products corresponding to that rank update to be set to 0.

19. The computer program product of claim 18, wherein outer-products corresponding to rank mask bits in the K-bit rank mask set to 1 are included in a summation with other enabled rank-update products.

20. The computer program product of claim 15 further comprising storing the outer-product of the result matrix in an accumulator.

* * * * *